US012125467B2

(12) United States Patent
Wang et al.

(10) Patent No.: US 12,125,467 B2
(45) Date of Patent: Oct. 22, 2024

(54) ACTIVE NOISE REDUCTION SYSTEM

(71) Applicant: HONDA MOTOR CO., LTD., Tokyo (JP)

(72) Inventors: Xun Wang, Saitama (JP); Toshio Inoue, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 148 days.

(21) Appl. No.: 18/169,349

(22) Filed: Feb. 15, 2023

(65) Prior Publication Data

US 2023/0290331 A1 Sep. 14, 2023

(30) Foreign Application Priority Data

Mar. 9, 2022 (JP) ................................ 2022-036187

(51) Int. Cl.
*G10K 11/178* (2006.01)

(52) U.S. Cl.
CPC .... *G10K 11/1783* (2018.01); *G10K 11/17815* (2018.01); *G10K 11/17853* (2018.01); *G10K 11/17881* (2018.01); *G10K 2210/1282* (2013.01)

(58) Field of Classification Search
None
See application file for complete search history.

(56) References Cited

U.S. PATENT DOCUMENTS

2019/0116421 A1* 4/2019 Kano ...................... H04R 3/04
2020/0366987 A1 11/2020 Furuta et al.

FOREIGN PATENT DOCUMENTS

WO 2019106748 A1 6/2019

* cited by examiner

*Primary Examiner* — Kenny H Truong
(74) *Attorney, Agent, or Firm* — Armstrong Teasdale LLP

(57) ABSTRACT

An active noise reduction system includes a reference signal generator configured to generate a reference signal, a canceling sound generator configured to generate a canceling sound, an error detector configured to detect an error between a noise and the canceling sound and generate an error signal corresponding to the error, and a controller configured to control the canceling sound generator based on the reference signal and the error signal, wherein the controller is configured to update an estimation value of acoustic characteristics in an internal space of a mobile body based on the reference signal and the error signal, estimate a head position of an occupant in the internal space based on the updated estimation value of the acoustic characteristics, and update a control filter based on the estimated head position of the occupant, the control filter being a filter for controlling the canceling sound generator.

6 Claims, 13 Drawing Sheets

$T_C$

| head position of occupant | $\hat{C}_{me}$ |
|---|---|
| position 1 | coefficient: 0.0, 0.32, ···, 0.01 |
| ··· | ··· |
| position N | coefficient: 0.0, 0.35, ···, 0.0 |

Fig.4A $T_C$

| head position of occupant | $\hat{C}_{me}$ |
|---|---|
| position 1 | $T_1$ (table below) |
| ··· | ··· |
| position N | $T_N$ (table below) |

$T_1$ (position 1):

| frequency | $\hat{C}0$ | $\hat{C}1$ |
|---|---|---|
| f1 | 0.2 | 0.2 |
| f2 | 0.4 | −0.1 |
| ··· | ··· | ··· |
| fn | 1.5 | 0.2 |

$T_N$ (position N):

| frequency | $\hat{C}0$ | $\hat{C}1$ |
|---|---|---|
| f1 | 0.1 | 0.2 |
| f2 | 0.3 | −0.1 |
| ··· | ··· | ··· |
| fn | 1.6 | 0.2 |

Fig.4B $$\hat{C}_{me} = \frac{C_e}{C_m}$$

$$\hat{H}_{me} = \frac{H_e}{H_m}$$

head position of occupant (position 1, position 2, position 3, ···)

coefficients of secondary path filter $\hat{C}$

FIR filter

SAN filter position 1

| frequency | $\hat{C}0$ | $\hat{C}1$ |
|---|---|---|
| f1 | 0.1 | 0.2 |
| f2 | 0.5 | −0.1 |
| ··· | ··· | ··· |
| fn | 1.2 | 0.5 |
| ··· | ··· | ··· |

position 2

| frequency | $\hat{C}0$ | $\hat{C}1$ |
|---|---|---|
| f1 | 0.2 | 0.2 |
| f2 | 0.4 | −0.1 |
| ··· | ··· | ··· |
| fn | 1.5 | 0.2 |
| ··· | ··· | ··· |

⋮ ⋮ ⋮

ACTIVE NOISE REDUCTION SYSTEM

TECHNICAL FIELD

The present invention relates to an active noise reduction system that reduces a noise by causing a canceling sound in an opposite phase to the noise to interfere with the noise.

BACKGROUND ART

Conventionally, an active noise reduction system reduces a noise by causing a canceling sound in an opposite phase to the noise to interfere with the noise. For example, WO2019/106748A1 discloses an active noise reduction system configured to estimate a head position of an occupant based on a camera image and reduce a noise in the estimated head position of the occupant.

However, WO2019/106748A1 requires a dedicated device such as a camera to estimate the head position of the occupant. Accordingly, the configuration of the active noise reduction system may become complicated and the active noise reduction system may become expensive.

SUMMARY OF THE INVENTION

In view of the above background, an object of the present invention is to provide a simple and inexpensive active noise reduction system that can estimate a head position of an occupant and effectively reduce a noise at the estimated head position of the occupant.

To achieve such an object, one aspect of the present invention provides an active noise reduction system (11) for reducing a noise in an internal space (5) of a mobile body (1), the active noise reduction system comprising: a reference signal generator (12) configured to generate a reference signal corresponding to the noise; a canceling sound generator (13) configured to generate a canceling sound for canceling the noise; an error detector (14) configured to detect an error between the noise and the canceling sound and generate an error signal corresponding to the error; and a controller (15) configured to control the canceling sound generator based on the reference signal and the error signal, wherein the controller is configured to: update an estimation value of acoustic characteristics in the internal space based on the reference signal and the error signal; estimate a head position of an occupant in the internal space based on the updated estimation value of the acoustic characteristics in the internal space; and update a control filter (W) based on the estimated head position of the occupant, the control filter being a filter for controlling the canceling sound generator.

According to this aspect, based on the estimation value of the acoustic characteristics, the head position of the occupant can be estimated. Accordingly, when the head position of the occupant changes, the characteristics of the control filter can also be changed so as to follow the change in the head position of the occupant. Accordingly, it is possible to effectively reduce the noise at the head position of the occupant. Further, since a dedicated device (such as a camera) for estimating the head position of the occupant is not required, a simple and inexpensive active noise reduction system can be provided.

In the above aspect, preferably, the controller is further configured to: based on the estimated head position of the occupant, generate an estimation signal of the noise at the head position of the occupant and an estimation signal of the canceling sound at the head position of the occupant; and update the control filter such that an error between the estimation signal of the noise at the head position of the occupant and the estimation signal of the canceling sound at the head position of the occupant is minimized.

According to this aspect, based on the estimated head position of the occupant, the control filter can be updated appropriately. Accordingly, the noise at the head position of the occupant can be reduced more effectively.

In the above aspect, preferably, the controller is further configured to: based on the reference signal and the error signal, update an estimation value of transfer characteristics of the noise from a noise source to the error detector and an estimation value of transfer characteristics of the canceling sound from the canceling sound generator to the error detector; based on the updated estimation value of the transfer characteristics of the noise from the noise source to the error detector, generate an estimation signal of the noise at a position of the error detector; generate the estimation signal of the noise at the head position of the occupant by correcting the estimation signal of the noise at the position of the error detector using a prescribed noise correction filter ($\hat{H}_{me}$); based on the updated estimation value of the transfer characteristics of the canceling sound from the canceling sound generator to the error detector, generate an estimation signal of the canceling sound at the position of the error detector; and generate the estimation signal of the canceling sound at the head position of the occupant by correcting the estimation signal of the canceling sound at the position of the error detector using a prescribed canceling correction filter ($\hat{C}_{me}$).

According to this aspect, the estimation signals of the noise and the canceling sound at the head position of the occupant can be appropriately generated based on the estimation signals of the noise and the canceling sound at the position of the error detector. That is, the noise and the canceling sound at the head position of the occupant can be properly estimated based on the estimation signals of the noise and the canceling sound at the position of the error detector. Accordingly, the noise at the head position of the occupant can be reduced more effectively.

In the above aspect, preferably, the canceling correction filter is defined as a ratio of transfer characteristics of the canceling sound from the canceling sound generator to the head position of the occupant to the transfer characteristics of the canceling sound from the canceling sound generator to the error detector, and the noise correction filter is defined as a ratio of transfer characteristics of the noise from the noise source to the head position of the occupant to the transfer characteristics of the noise from the noise source to the error detector.

According to this aspect, it is possible to minimize the influence of factors other than the transfer characteristics of the canceling sound (for example, changes in the state of the internal space) on the canceling correction filter. Accordingly, the canceling correction filter can appropriately correct the estimation signal of the canceling sound. Similarly, the influence of factors other than the transfer characteristics of the noise (for example, changes in the state of the internal space) on the noise correction filter can be minimized. Accordingly, the noise correction filter can appropriately correct the estimation signal of the noise.

In the above aspect, preferably, the controller is further configured to store in a table each of a first relationship and a second relationship, the first relationship being a relationship between the head position of the occupant and a coefficient of the canceling correction filter, the second relationship being a relationship between the head position of the occupant and a coefficient of the noise correction filter.

According to this aspect, based on the head position of the occupant, the coefficients of the canceling correction filter and the noise correction filter can be easily determined.

In the above aspect, preferably, the controller includes a neural network that has learned a relationship between the estimation value of the acoustic characteristics in the internal space and the head position of the occupant, and is configured to estimate the head position of the occupant by inputting the estimation value of the acoustic characteristics in the internal space into the neural network.

According to this aspect, based on the estimation value of the acoustic characteristics, the head position of the occupant can be accurately estimated.

Thus, according to the above aspects, it is possible to provide a simple and inexpensive active noise reduction system that can estimate a head position of an occupant and effectively reduce a noise at the estimated head position of the occupant.

BRIEF DESCRIPTION OF THE DRAWING(S)

FIGS. 4A and 4B are explanatory diagrams each showing a canceling correction table according to the first embodiment;

DETAILED DESCRIPTION OF THE INVENTION

Figure 1:
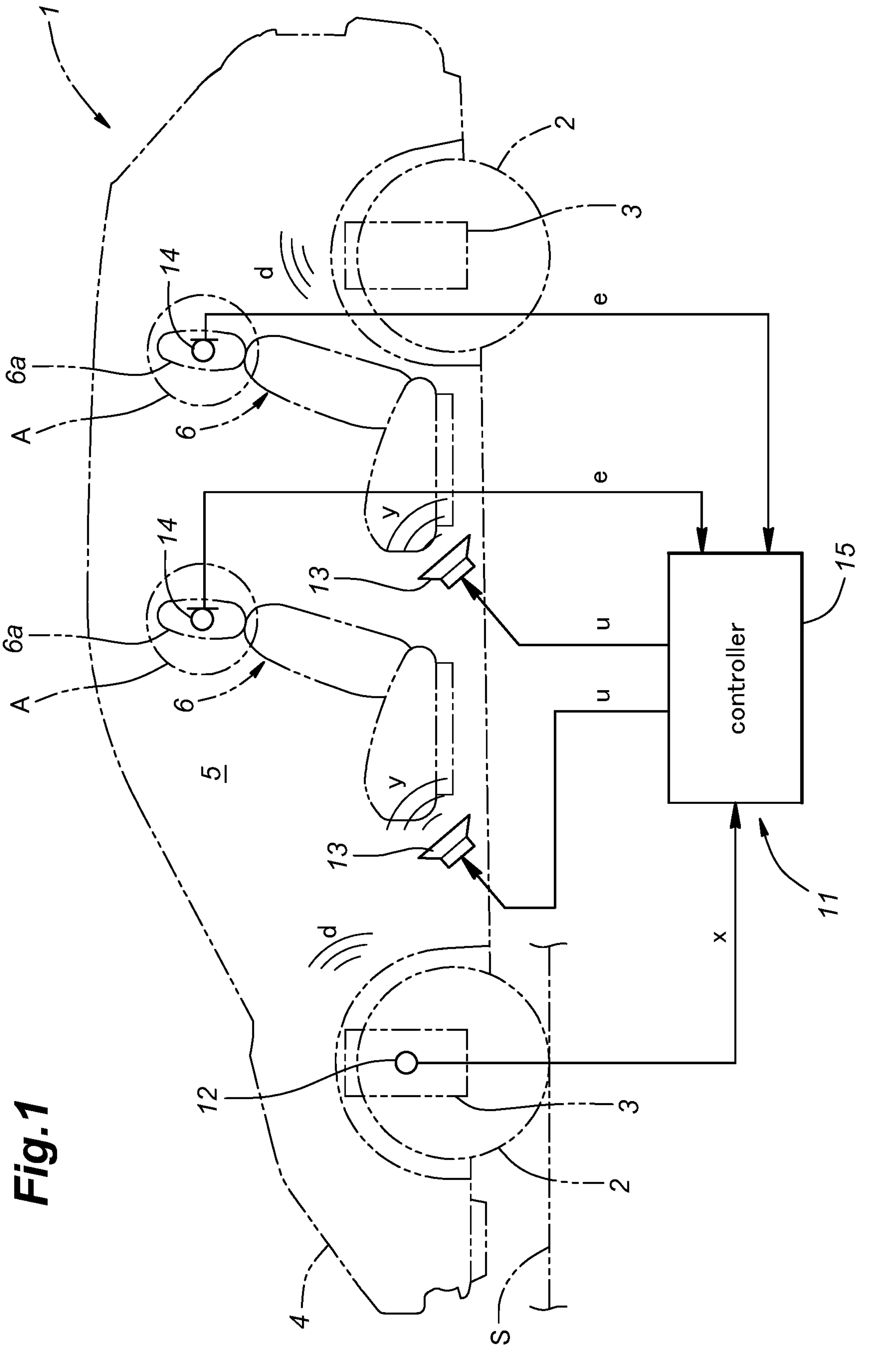
FIG. 1 is a schematic diagram showing a vehicle to which an active noise reduction system according to the first embodiment is applied.

In the following, embodiments of the present invention will be described with reference to the drawings. In this specification, "^" (circumflexes) shown together with symbols each indicate an identification value or an estimation value. "^" are shown above the symbols in the drawings and formulas, but are shown subsequently to the symbols in the text of the description.

The First Embodiment

First, the first embodiment of the present invention will be described with reference to FIGS. 1 to 11.

<The Active Noise Reduction System 11>

FIG. 1 is a schematic diagram showing a vehicle 1 (an example of a mobile body) to which an active noise reduction system 11 (hereinafter abbreviated as "noise reduction system 11") according to the first embodiment is applied. When wheels 2 vibrate due to the force received from a road surface S and the vibration of the wheels 2 are transmitted to a vehicle body 4 via suspensions 3, a road noise d is generated in a vehicle cabin 5 (an example of an internal space of the mobile body). The noise reduction system 11 according to the first embodiment is a feedback-controllable active noise control device (ANC device) for reducing such a road noise d. More specifically, the noise reduction system 11 reduces the road noise d by generating a canceling sound y that is in an opposite phase to the road noise d and causing the generated canceling sound y to interfere with the road noise d.

Figure 2:
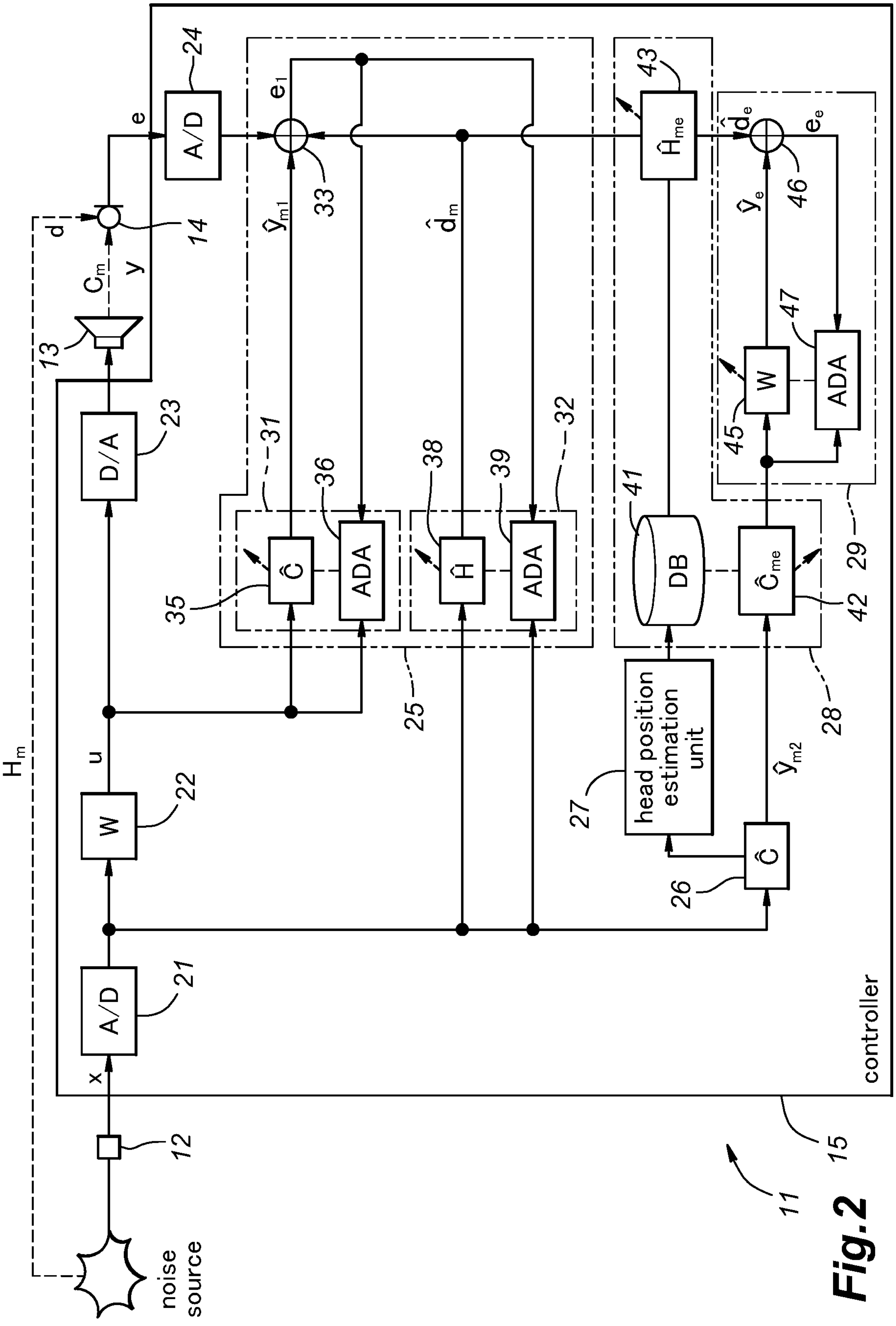
FIG. 2 is a functional block diagram showing the active noise reduction system according to the first embodiment.

With reference to FIGS. 1 and 2, the noise reduction system 11 includes a vibration sensor 12 (an example of a reference signal generator) configured to generate a reference signal x corresponding to the road noise d, a plurality of speakers 13 (an example of a canceling sound generator) configured to generate the canceling sound y for canceling the road noise d, a plurality of error microphones 14 (an example of an error detector) configured to detect an error (synthetic sound) between the road noise d and the canceling sound y and generate an error signal e corresponding to the detected error, and a controller 15 configured to control the plurality of speakers 13 based on the reference signal x and the error signal e.

A symbol $H_m$ in FIG. 2 indicates transfer characteristics of the road noise d (transfer characteristics of a primary path: an example of acoustic characteristics in the vehicle cabin 5) from a noise source (in the present embodiment, the road surface S) to each error microphone 14. A symbol $C_m$ in FIG. 2 indicates transfer characteristics of the canceling sound y (transfer characteristics of a secondary path: an example of acoustic characteristics in the vehicle cabin 5) from the speaker 13 to each error microphone 14.

<The Vibration Sensor 12>

With reference to FIG. 1, the vibration sensor 12 of the noise reduction system 11 is installed in at least one suspension 3, for example. The vibration sensor 12 detects the acceleration of the suspension 3 according to the road noise d and generates the reference signal x according to the acceleration of the suspension 3. In another embodiment, the vibration sensor 12 may be installed in a location other than the suspension 3 of the vehicle 1.

<The Speakers 13>

With reference to FIG. 1, each speaker 13 of the noise reduction system 11 constitutes, for example, a portion of an audio system of the vehicle 1, and is installed in a door of the vehicle 1. In another embodiment, the speaker 13 may be provided separately from the audio system of the vehicle 1, or may be installed in a location other than the door of the vehicle 1 (for example, the speaker 13 may be installed in a headrest 6*a* of an occupant seat 6 or on a floor below the occupant seat 6).

<The Error Microphones 14>

Each error microphone 14 of the noise reduction system 11 is installed, for example, in the headrest 6*a* of the occupant seat 6. In another embodiment, the error microphone 14 may be installed in a location other than the occupant seat 6 of the vehicle 1 (for example, the error microphone 14 may be installed on a ceiling above the occupant seat 6).

<The Controller 15>

The controller 15 of the noise reduction system 11 consists of an electronic control unit (ECU) that includes an arithmetic processing unit (a processor such as CPU and MPU) and a storage device (memory such as ROM and RAM). The controller 15 may consist of one piece of hardware, or may consist of a unit composed of plural pieces of hardware.

With reference to FIG. 2, the controller 15 includes, as functional components, a first A/D conversion unit 21, a control signal output unit 22, a D/A conversion unit 23, a second A/D conversion unit 24, an acoustic characteristics update unit 25, a reference signal correction unit 26, a head position estimation unit 27, an estimation signal correction unit 28, and a control filter update unit 29. Symbols "ADA" in FIG. 2 indicate "adaptive".

<The First A/D Conversion Unit 21>

The first A/D conversion unit 21 of the controller 15 converts an analog reference signal x output from the vibration sensor 12 into a digital reference signal x, and outputs the digital reference signal x to the control signal output unit 22, the acoustic characteristics update unit 25, and the reference signal correction unit 26. Hereinafter, "reference signal x" without explanation indicates the reference signal x that has passed through the first A/D conversion unit 21.

<The Control Signal Output Unit 22>

The control signal output unit 22 of the controller 15 consists of a control filter W. A finite impulse response filter (FIR filter) or a single-frequency adaptive notch filter (SAN filter) may be used for the control filter W. The control signal output unit 22 generates a control signal u by filtering the reference signal x, and outputs the generated control signal u to the D/A conversion unit 23 and the acoustic characteristics update unit 25.

<The D/a Conversion Unit 23>

The D/A conversion unit 23 of the controller 15 converts a digital control signal u output from the control signal output unit 22 into an analog control signal u, and outputs the analog control signal u to the speaker 13. Thus, the speaker 13 generates the canceling sound y according to the control signal u.

<The Second A/D Conversion Unit 24>

The second A/D conversion unit 24 of the controller 15 converts the error signal e output from the error microphone 14 from an analog signal to a digital signal, and outputs the converted error signal e to the acoustic characteristics update unit 25. Hereinafter, "error signal e" without explanation indicates the error signal e that has passed through the second A/D conversion unit 24.

<The Acoustic Characteristics Update Unit 25>

The acoustic characteristics update unit 25 of the controller 15 updates an estimation value of the acoustic characteristics in the vehicle cabin 5 based on the reference signal x, the control signal u, and the error signal e. The acoustic characteristics update unit 25 includes a canceling estimation signal generation unit 31, a noise estimation signal generation unit 32, and an adder 33.

The canceling estimation signal generation unit 31 includes a secondary path filter unit 35 and a secondary path update unit 36.

The secondary path filter unit 35 consists of a secondary path filter $\hat{C}$. The secondary path filter $\hat{C}$ is a filter corresponding to an estimation value of the transfer characteristics $C_m$ (an example of an estimation value of the acoustic characteristics) of the canceling sound y from the speaker 13 to the error microphone 14. An FIR filter or a SAN filter may be used for the secondary path filter $\hat{C}$.

The secondary path filter unit 35 generates a canceling estimation signal $\hat{y}_{m1}$ by filtering the control signal u using the secondary path filter $\hat{C}$. The canceling estimation signal $\hat{y}_{m1}$ is an estimation signal of the canceling sound y at a position of the error microphone 14 (hereinafter referred to as "microphone position"). The secondary path filter unit 35 outputs the generated canceling estimation signal $\hat{y}_{m1}$ to the adder 33.

The secondary path update unit 36 updates coefficients of the secondary path filter $\hat{C}$ using an adaptive algorithm such as a Least Mean Square algorithm (LMS algorithm). More specifically, the secondary path update unit 36 updates the coefficients of the secondary path filter $\hat{C}$ such that a virtual error signal $e_1$ (that will be described later) output from the adder 33 is minimized.

The noise estimation signal generation unit 32 includes a primary path filter unit 38 and a primary path update unit 39.

The primary path filter unit 38 consists of a primary path filter $\hat{H}$. The primary path filter $\hat{H}$ is a filter corresponding to an estimation value of the transfer characteristics $H_m$ (an example of an estimation value of the acoustic characteristics) of the road noise d from the noise source to the error microphone 14. An FIR filter or a SAN filter may be used for the primary path filter $\hat{H}$.

The primary path filter unit 38 generates a noise estimation signal $\hat{d}_m$ by filtering the reference signal x using the primary path filter $\hat{H}$. The noise estimation signal $\hat{d}_m$ is an estimation signal of the noise at the microphone position. The primary path filter unit 38 outputs the generated noise estimation signal $\hat{d}_m$ to the adder 33 and the estimation signal correction unit 28.

The primary path update unit 39 updates the coefficients of the primary path filter $\hat{H}$ using an adaptive algorithm such as the LMS algorithm. More specifically, the primary path update unit 39 updates the coefficients of the primary path filter $\hat{H}$ such that the virtual error signal $e_1$ (that will be described later) output from the adder 33 is minimized.

The adder 33 generates the virtual error signal $e_1$ by adding together the error signal e, the canceling estimation signal $\hat{y}_{m1}$, and the noise estimation signal $\hat{d}_m$. The adder 33 outputs the generated virtual error signal $e_1$ to the canceling estimation signal generation unit 31 and the noise estimation signal generation unit 32.

<The Reference Signal Correction Unit 26>

The reference signal correction unit 26 of the controller 15, like the canceling estimation signal generation unit 31, consists of the secondary path filter $\hat{C}$. When the coefficients of the secondary path filter $\hat{C}$ are updated in the canceling estimation signal generation unit 31, the updated coefficients of the secondary path filter $\hat{C}$ are output to the reference signal correction unit 26, and the coefficients of the secondary path filter $\hat{C}$ are updated in the reference signal correction unit 26. That is, the coefficients of the secondary path filter $\hat{C}$ set in the reference signal correction unit 26 are not fixed values but values that are successively updated based on the signal from the canceling estimation signal generation unit 31.

The reference signal correction unit 26 generates a canceling estimation signal $\hat{y}_{m2}$ by filtering the reference signal x. The canceling estimation signal $\hat{y}_{m2}$ is an estimation signal of the canceling sound y at the microphone position, like the canceling estimation signal $\hat{y}_{m1}$. The canceling estimation signal $\hat{y}_{m2}$ includes information on the secondary path filter C^. The reference signal correction unit 26 outputs the generated canceling estimation signal $y\hat{}_{m2}$ to the head position estimation unit 27 and the estimation signal correction unit 28.

<The Head Position Estimation Unit 27>

The head position estimation unit 27 of the controller 15 estimates the head position of the occupant in the vehicle cabin 5 based on the secondary path filter C^. More specifically, the head position estimation unit 27 estimates the head position of the occupant in the vehicle cabin 5 based on the coefficients of the secondary path filter C^ copied from the reference signal correction unit 26. The head position estimation unit 27 outputs the estimated head position of the occupant to the estimation signal correction unit 28.

Figure 3:
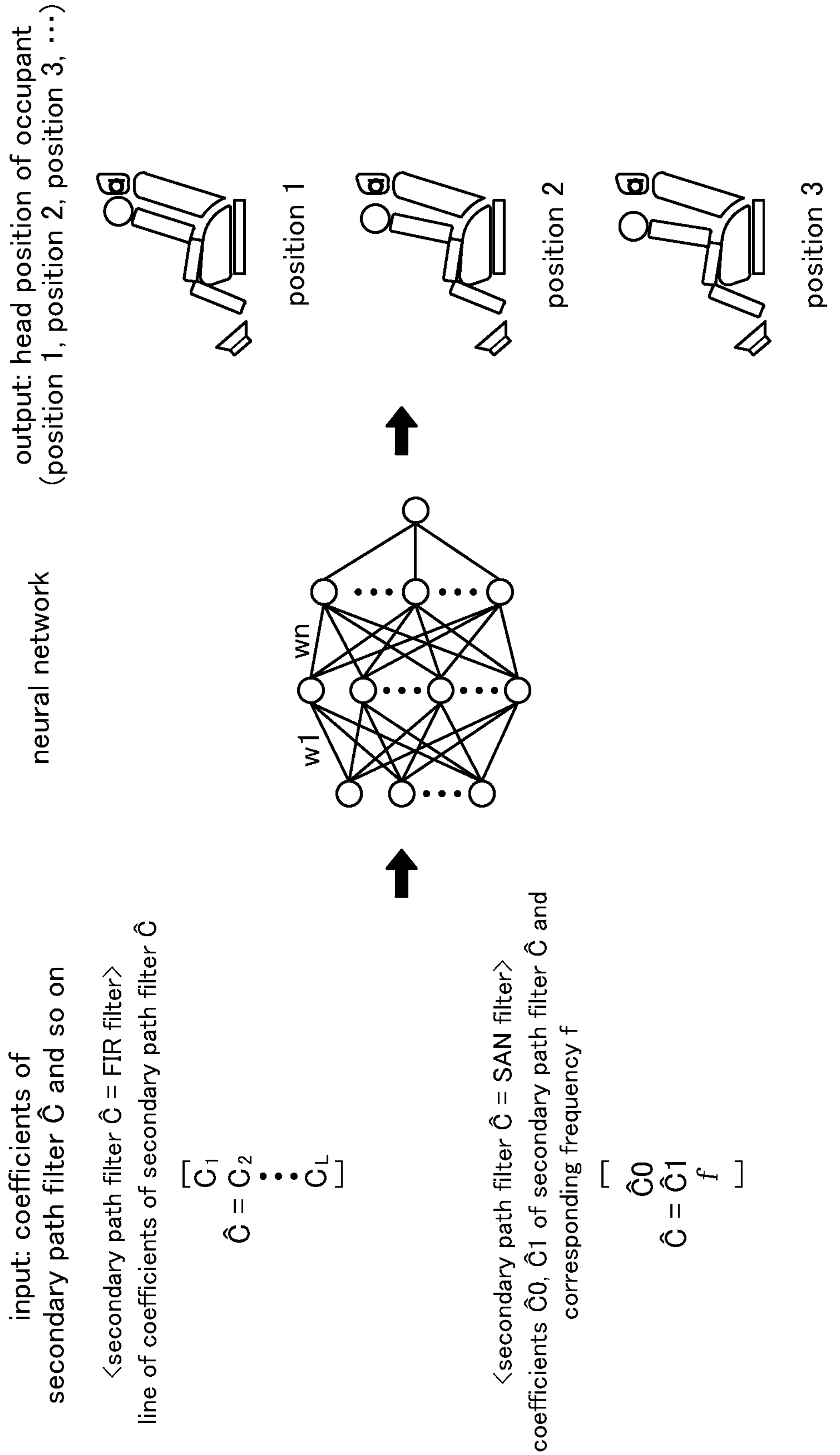
FIG. 3 is an explanatory diagram showing a process of estimating a head position of an occupant by a head position estimation unit according to the first embodiment.

With reference to FIG. 3, the head position estimation unit 27 includes a neural network that has learned a relationship between the secondary path filter C^ and the head position of the occupant. A neural network consists of n layers (n: integer). Each layer of the neural network has the corresponding coefficient (w1, w2, . . . wn). A method of building the neural network will be described later.

When an FIR filter is used for the secondary path filter C^, the head position estimation unit 27 copies a sequence of coefficients ($C_1$, $C_2$, . . . , $C_L$) of the secondary path filter C^ corresponding to the impulse response from the reference signal correction unit 26. The sequence of coefficients of the secondary path filter C^ corresponding to the impulse response may be copied as a graph. The head position estimation unit 27 inputs the copied sequence of coefficients of the secondary path filter C^ into the neural network, and then acquires the head position (position 1, position 2, position 3, . . . ) of the occupant output from the neural network in response to this input.

When a SAN filter is used for the secondary path filter C^, the head position estimation unit 27 copies the coefficients C^0, C^1 of the secondary path filter C^ and the corresponding frequency f from the reference signal correction unit 26. The head position estimation unit 27 inputs the copied coefficients C^0, C^1 of the secondary path filter C^ and the corresponding frequency f into the neural network, and then acquires the head position (position 1, position 2, position 3, . . . ) of the occupant output from the neural network in response to this input.

<The Estimation Signal Correction Unit 28>

With reference to FIG. 2, the estimation signal correction unit 28 of the controller 15 corrects the canceling estimation signal $y\hat{}_{m2}$ and the noise estimation signal $d\hat{}_{m}$ based on the head position of the occupant estimated by the head position estimation unit 27. The estimation signal correction unit 28 includes a database unit 41, a canceling correction unit 42, and a noise correction unit 43.

With reference to FIGS. 4A and 4B, the database unit 41 stores a canceling correction table Tc. A method of building the canceling correction table Tc will be described later.

With reference to FIG. 4A, when an FIR filter is used for the secondary path filter C^, the canceling correction table Tc stores a sequence of coefficients of a canceling correction filter $C\hat{}_{me}$ (that will be described later) for each head position of the occupant. The database unit 41 reads the sequence of coefficients of the canceling correction filter $C\hat{}_{me}$ by referring to the canceling correction table Tc based on the head position of the occupant estimated by the head position estimation unit 27. The database unit 41 outputs the read sequence of coefficients of the canceling correction filter $C\hat{}_{me}$ to the canceling correction unit 42.

With reference to FIG. 4B, when a SAN filter is used for the secondary path filter C^, the canceling correction table Tc stores a coefficient table TN of the canceling correction filter $C\hat{}_{me}$ for each head position of the occupant. The coefficient table TN of the canceling correction filter $C\hat{}_{me}$ stores the coefficients C^0, C^1 of the canceling correction filter $C\hat{}_{me}$ for each frequency f. The database unit 41 determines the coefficient table TN to be used by referring to the canceling correction table Tc based on the head position of the occupant estimated by the head position estimation unit 27. Furthermore, the database unit 41 reads the coefficients C^0, C^1 of the canceling correction filter C corresponding to the current control target frequency by referring to the coefficient table TN to be used based on the current control target frequency. The database unit 41 outputs the read coefficients C^0, C^1 of the canceling correction filter $C\hat{}_{me}$ to the canceling correction unit 42.

Although not shown, the database unit 41 stores a noise correction table similar to the above canceling correction table Tc. In a method similar to the above, the database unit 41 reads a sequence of coefficients of a noise correction filter $H\hat{}_{me}$ (that will be described later) or coefficients H^0, H^1 of the noise correction filter $H\hat{}_{me}$ corresponding to the current control target frequency. The database unit 41 outputs the read sequence of coefficients of the noise correction filter H or the coefficients H^0, H^1 of the noise correction filter $H\hat{}_{me}$ corresponding to the current control target frequency to the noise correction unit 43.

As described above, the database unit 41 stores in a table each of a first relationship (a relationship between the head position of the occupant and the coefficients of the canceling correction filter $C\hat{}_{me}$) and a second relationship (a relationship between the head position of the occupant and the coefficients of the noise correction filter $H\hat{}_{me}$).

With reference to FIG. 2, the canceling correction unit 42 consists of the canceling correction filter C^me. An FIR filter or a SAN filter may be used for the canceling correction filter C^me. The coefficients of the canceling correction filter $C^{\wedge me}$ are updated successively by the coefficients of the canceling correction filter $C^{\wedge me}$ output from the database unit 41.

Figure 5:
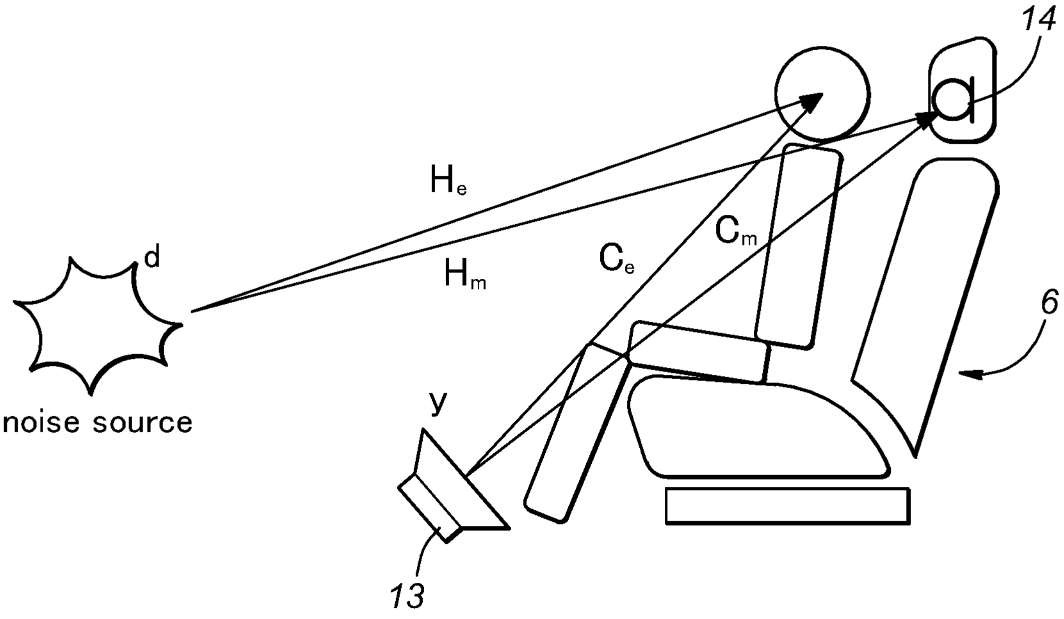
FIG. 5 is an explanatory diagram showing the definitions of a canceling correction filter and a noise correction filter according to the first embodiment.

With reference to FIG. 5, the canceling correction filter $C\hat{}_{me}$ is defined by the following formula (1). Incidentally, "$C_e$" in the following formula (1) represents the transfer characteristics of the canceling sound y from the speaker 13 to the head position of the occupant (more specifically, the ear position of the occupant), and "$C_m$" in the following formula (1) represents the transfer characteristics of the canceling sound y from the speaker 13 to the error microphone 14.

$$\hat{C}_{me} = \frac{C_e}{C_m} \quad (1)$$

As is clear from the above formula (1), the canceling correction filter $C\hat{}_{me}$ is defined as a ratio of the transfer characteristics $C_e$ of the canceling sound y from the speaker 13 to the head position of the occupant to the transfer characteristics $C_m$ of the canceling sound y from the speaker 13 to the error microphone 14.

With reference to FIG. 2, the canceling correction unit 42 generates a canceling estimation signal $y\hat{}_{e}$ by correcting the canceling estimation signal $y\hat{}_{m2}$ using the canceling correction filter $C\hat{}_{me}$. The canceling estimation signal $y\hat{}_{e}$ is an estimation signal of the canceling sound y at the head position of the occupant (more specifically, the ear position of the occupant).

Figure 6:
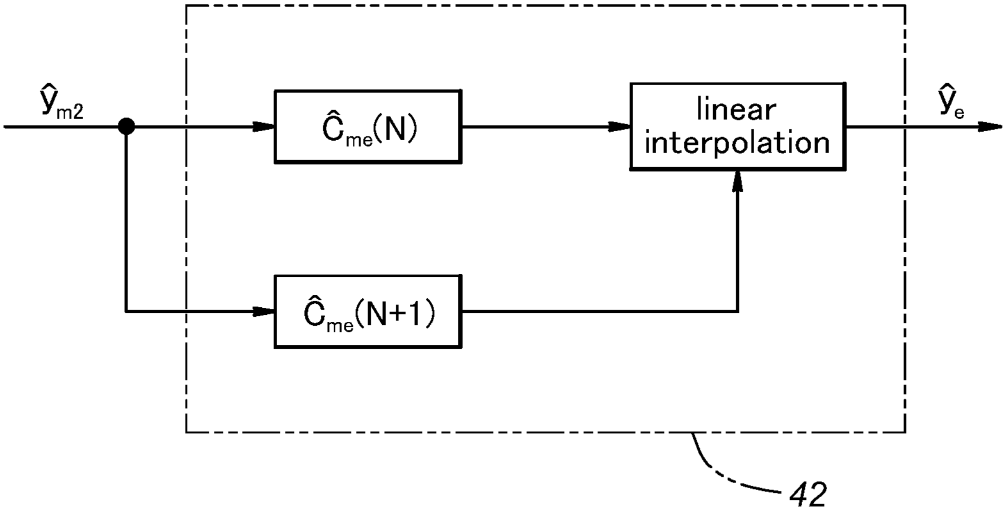
FIG. 6 is a functional block diagram showing a canceling correction unit according to the first embodiment.

Incidentally, with reference to FIG. 6, the head position of the occupant estimated by the head position estimation unit 27 may be present between a position N (N: integer) and a position N+1. In such a case, the canceling correction unit 42 may generate the canceling estimation signal $y\hat{}_e$ by performing linear interpolation on the canceling estimation signal $y\hat{}_{m2}$ based on the canceling correction filter $C\hat{}_{me}$ (N) at the position N and the canceling correction filter $C\hat{}_{me}$ (N+1) at the position N+1.

With reference to FIG. 2, the noise correction unit 43 consists of the noise correction filter $H\hat{}_{me}$. An FIR filter or a SAN filter may be used for the noise correction filter $H\hat{}_{me}$. The coefficients of the noise correction filter $H\hat{}_{me}$ are updated successively by the coefficients of the noise correction filter $H\hat{}_{me}$ output from the database unit 41.

With reference to FIG. 5, the noise correction filter $H\hat{}_{me}$ is defined by the following formula (2). Incidentally, He in the following formula (2) represents the transfer characteristics of the road noise d from the noise source to the head position of the occupant (more specifically, the ear position of the occupant), and $H_m$ in the following formula (2) represents the transfer characteristics of the road noise d from the noise source to the error microphone 14.

$$\hat{H}_{me} = \frac{H_e}{H_m} \tag{2}$$

As is clear from the above formula (2), the noise correction filter $H\hat{}_{me}$ is defined as the ratio of the transfer characteristics He of the road noise d from the noise source to the head position of the occupant to the transfer characteristics $H_m$ of the road noise d from the noise source to the error microphone 14.

With reference to FIG. 2, the noise correction unit 43 generates a noise estimation signal $d\hat{}_e$ by correcting the noise estimation signal $d\hat{}_m$ using the noise correction filter $H\hat{}_{me}$. The noise estimation signal $d\hat{}_e$ is an estimation signal of the road noise d at the head position of the occupant (more specifically, the ear position of the occupant). The noise correction unit 43 may generate the noise estimation signal $d\hat{}_e$ by performing linear interpolation on the noise estimation signal $d\hat{}_m$, like the canceling correction unit 42.

<The Control Filter Update Unit 29>

The control filter update unit 29, like the control signal output unit 22, consists of the control filter W. The control filter update unit 29 updates the control filter W based on the head position of the occupant estimated by the head position estimation unit 27. The control filter update unit 29 includes a control filter unit 45, an adder 46, and a control update unit 47.

The control filter unit 45 uses the control filter W to filter the canceling estimation signal $y\hat{}_e$. Hereinafter, "the canceling estimation signal $y\hat{}_e$" indicates the canceling estimation signal $y\hat{}_e$ that has passed through the control filter unit 45.

The adder 46 generates a virtual error signal $e_e$ by adding together the canceling estimation signal $y\hat{}_e$ and the noise estimation signal $d\hat{}_e$. The adder 46 outputs the generated virtual error signal $e_e$ to the control update unit 47.

The control update unit 47 updates the coefficients of the control filter W using an adaptive algorithm such as the LMS algorithm. More specifically, the control update unit 47 updates the coefficients of the control filter W such that the virtual error signal $e_e$ output from the adder 46 is minimized.

When the coefficients of the control filter W are updated in the control filter update unit 29 in this way, the updated coefficients of the control filter W are output to the control signal output unit 22, and the coefficients of the control filter W are updated in the control signal output unit 22. That is, the coefficients of the control filter W set in the control signal output unit 22 are not fixed values but values that are sequentially updated based on the signal from the control filter update unit 29.

<The Mechanism for Reducing the Road Noise>

Next, the mechanism for reducing the road noise d by the noise reduction system 11 will be described.

The canceling estimation signal $y\hat{}_e$ can be expressed by the following formula (3) according to the configuration of the noise reduction system 11 and the definition of the canceling correction filter $C\hat{}_{me}$. Similarly, the noise estimation signal $d\hat{}_e$ can be expressed by the following formula (4) based on the configuration of the noise reduction system 11 and the definition of the noise correction filter $H\hat{}_{me}$.

$$\hat{y}_e = x\hat{C}\hat{C}_{me}W = x\hat{C}\frac{C_e}{C_m}W = xC_eW \tag{3}$$

$$\hat{d}_e = x\hat{H}\hat{H}_{me} = x\hat{H}\frac{H_e}{H_m} = xH_e \tag{4}$$

As is clear from the above formulas (3) and (4), the virtual error signal $e_e$ (=$d\hat{}_e$+$y\hat{}_e$) corresponds to the sound pressure after control (after reduction) at the head position of the occupant. Accordingly, the road noise d at the head position of the occupant can be effectively suppressed by updating the coefficients of the control filter W such that the virtual error signal $e_e$ is minimized as described above.

The Effects of the First Embodiment

The controller 15 according to the first embodiment updates the primary path filter H^ and the secondary path filter C^ based on the reference signal x and the error signal e. In other words, the controller 15 updates the estimation value of the acoustic characteristics of the internal space based on the reference signal x and the error signal e. Accordingly, even if the acoustic characteristics of the internal space change according to the displacement of each error microphone 14, the characteristics of the control filter W can be changed to follow the change in the acoustic characteristics. Accordingly, the error microphone 14 can be arranged on a movable portion such as the headrest 6*a*, and thus located closer to the head position of the occupant.

By the way, the area where the control effect (sound reduction effect) of the noise reduction system 11 is high is limited to an area around each error microphone 14 (see circles A in FIG. 1). Accordingly, when the head of the occupant moves away from the error microphone 14 due to the driving posture of the occupant, the control effect of the noise reduction system 11 that the occupant can feel may decrease.

As such, the controller 15 estimates the head position of the occupant in the vehicle cabin 5 based on the updated secondary path filter C^, and updates the control filter W for controlling the speaker 13 based on the estimated head position of the occupant. Accordingly, when the head position of the occupant changes, the characteristics of the control filter W can also change to follow the change in the head position of the occupant. Accordingly, it is possible to effectively reduce the road noise d at the head position of the occupant. Further, a dedicated device (such as a camera) for estimating the head position of the occupant is not required. Accordingly, a simple and inexpensive noise reduction system 11 can be provided.

Figure 7:
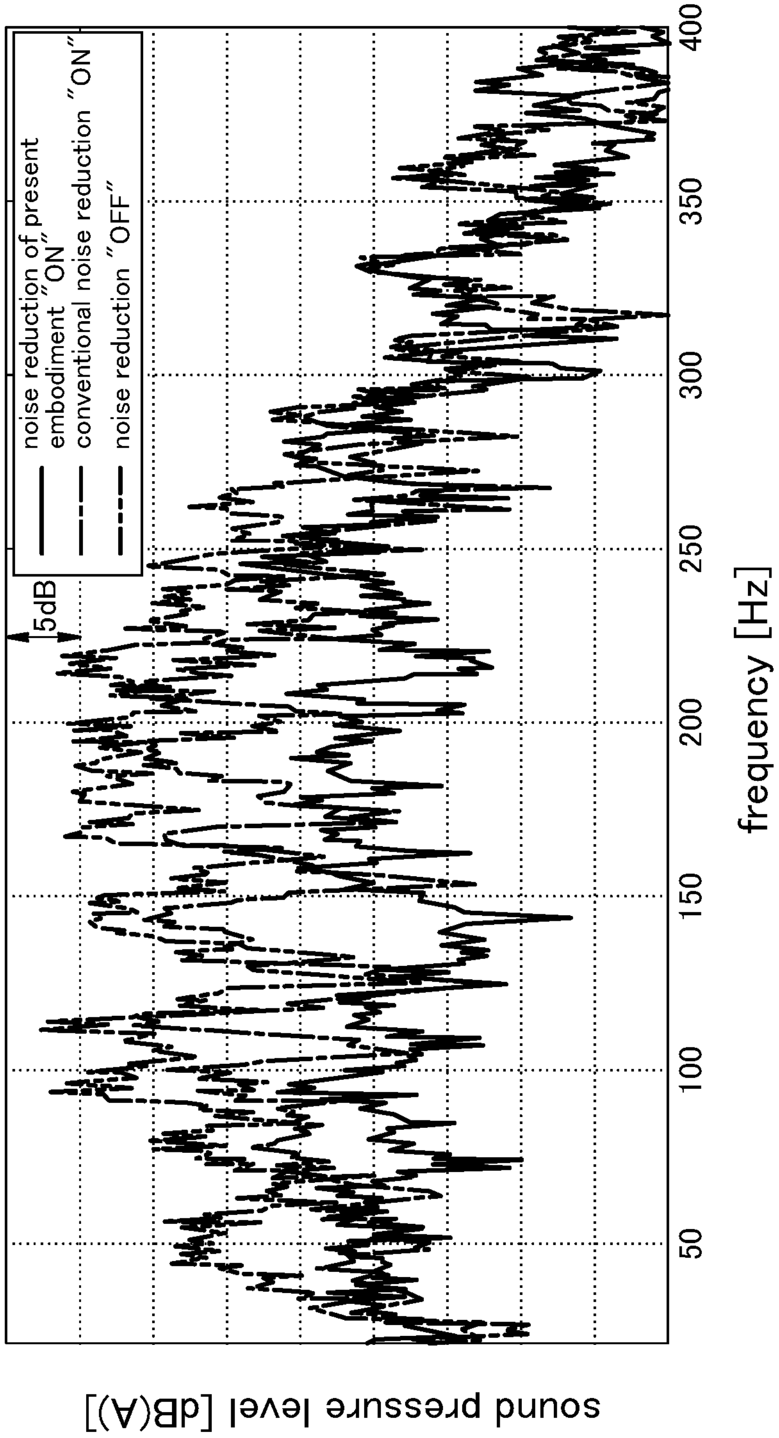
FIG. 7 is a graph showing the effect of reducing a road noise.

FIG. 7 is a graph showing the effect of reducing the road noise d at the head position of the occupant (more specifically, the ear position of the occupant). As shown in FIG. 7, when the noise reduction of the present embodiment (that is, the noise reduction system 11 that updates the control filter W based on the head position of the occupant) is ON, the road noise d can be reduced in a wide frequency band as compared with a case where the conventional noise reduction (that is, the noise reduction system that updates the control filter W without considering the head position of the occupant) is ON and a case where the noise reduction is OFF.

<The Method of Building the Neural Network>

Next, the method of building the neural network that constitutes the head position estimation unit 27 will be described.

Figure 8:
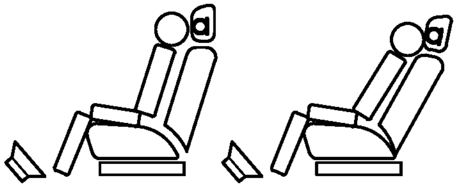
FIG. 8 is an explanatory diagram showing a method of building a neural network according to the first embodiment.
Figure 8:
Figure 8:
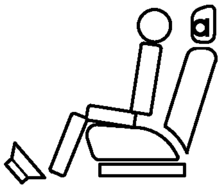
Figure 8:
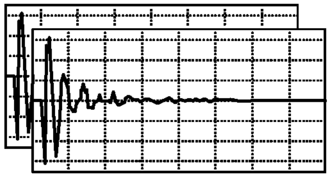

With reference to FIG. 8, when the neural network is built, the data for learning is collected. More specifically, the coefficients of the secondary path filter C^ are measured for each head position of the occupant. This measurement may be performed with a mannequin or the like arranged on the occupant seat 6, or may be performed with the occupant actually sitting on the occupant seat 6. When an FIR filter is used for the secondary path filter C^, the measured coefficients of the secondary path filter C^ are output as an impulse response waveform. When a SAN filter is used for the secondary path filter C^, the measured coefficients of the secondary path filter C^ are output for each frequency.

The head position of the occupant is determined by the relative positional relationship between the error microphone 14 and the head position of the occupant. Accordingly, regardless of whether the backrest of the occupant seat 6 is reclined, if the relative positional relationship between the error microphone 14 and the head position of the occupant is constant, the head position of the occupant is the same. (see "position 1" in FIG. 8).

Next, the coefficients of the secondary path filter C^ measured as described above are set as input values, the head positions of the occupant are set as output values, and the neural network learns the coefficients (w1, w2, . . . , wn) of each layer. For this learning, for example, a machine learning method such as deep learning may be used.

Next, the neural network that has learned the coefficient w of each layer is stored in the memory of the controller 15 as a system parameter. Accordingly, it is possible to estimate the head position of the occupant by the coefficients of the secondary path filter C^ using the neural network.

<The Method of Building the Canceling Correction Table Tc>

Figure 9C:
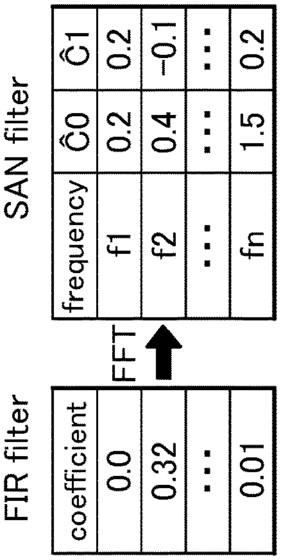
FIGS. 9A to 9C are explanatory diagrams showing a first example of a method of building the canceling correction table according to the first embodiment.
Figure 9B:
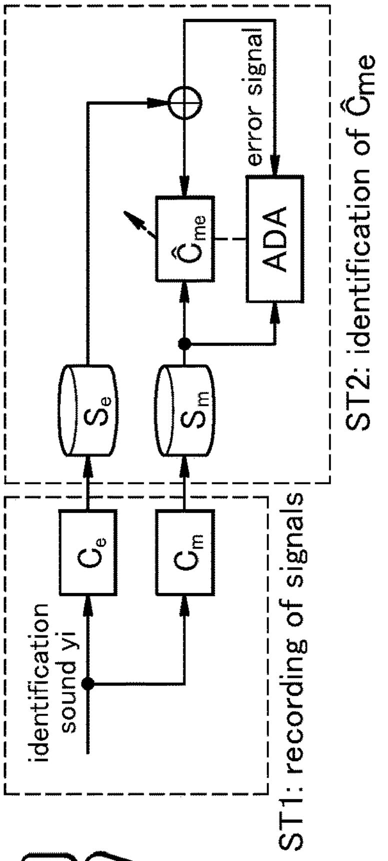
Figure 9A:
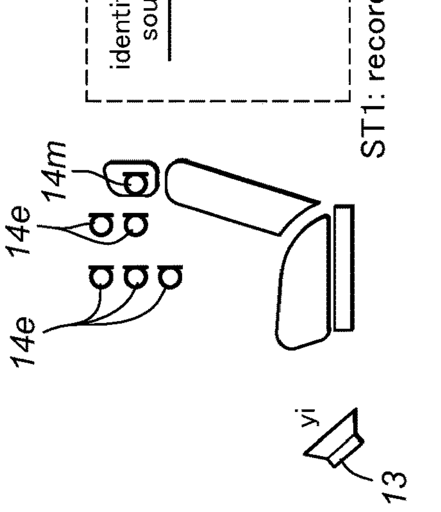
Figure 10:
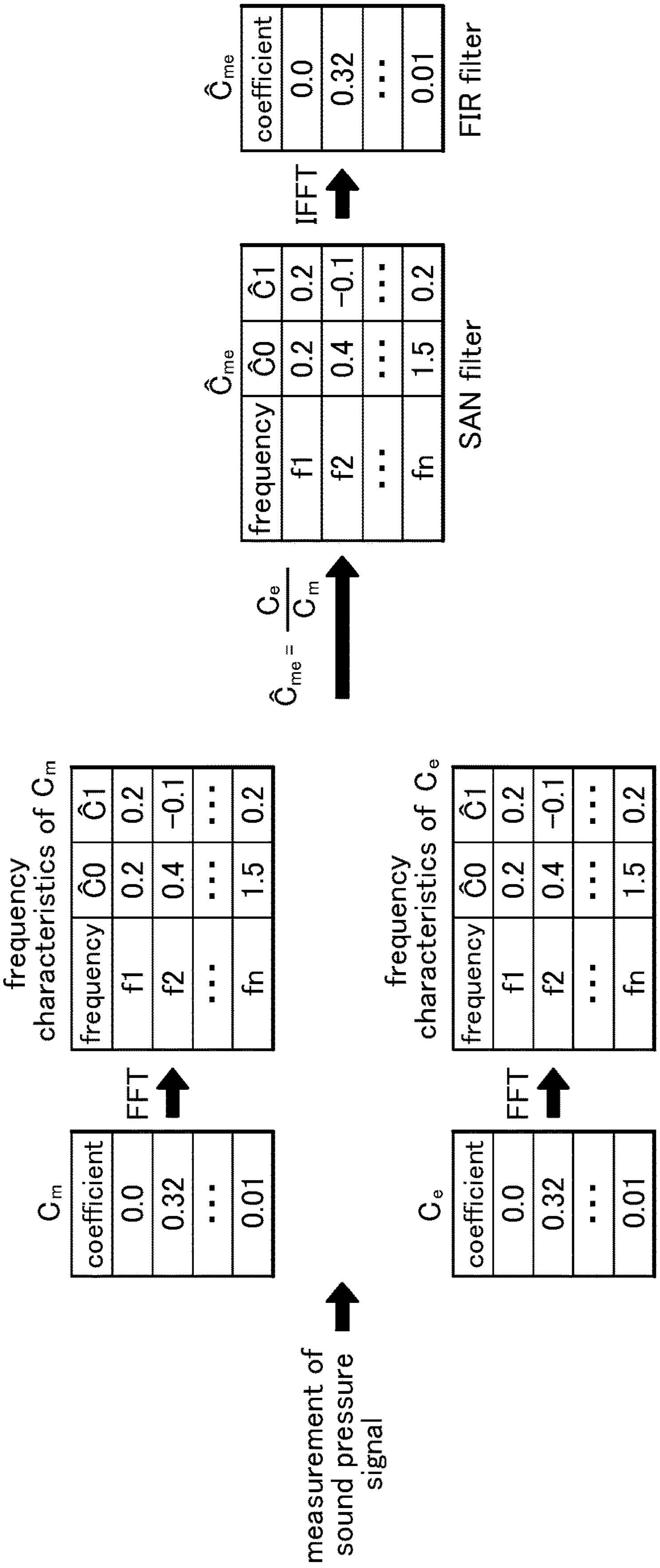
FIG. 10 is an explanatory diagram showing a second example of the method of building the canceling correction table according to the first embodiment.

Next, the method of building the canceling correction table Tc stored in the database unit 41 of the estimation signal correction unit 28 will be described with reference to FIGS. 9A to 9C and FIG. 10. FIGS. 9A to 9C are explanatory diagrams showing a first example of the method of building the canceling correction table Tc, and FIG. 10 is an explanatory diagram showing a second example of the method of building the canceling correction table Tc.

With reference to FIGS. 9A and 9B, in the first example of the method of building the canceling correction table Tc, the measuring microphone 14*m* measures the sound pressure signal $S_m$ at the microphone position while the identification sound yi is output from the speaker 13, and the measuring microphones 14*e* measure the sound pressure signals $S_e$ at the head positions of the occupant, and the measured sound pressure signals $S_m$ and $S_e$ are recorded (step ST1: recording of signals).

Next, using the recorded sound pressure signals $S_m$ and $S_e$, the coefficients of the canceling correction filter $C\hat{}_{me}$ are identified (step ST2: identification of $C\hat{}_{me}$). More specifically, the coefficients of the canceling correction filter C are updated such that the error signal between the sound pressure signal $S_e$ and the signal acquired by filtering the sound pressure signal $S_m$ using the canceling correction filter $C\hat{}_{me}$ is minimized. At this time, the coefficients of the canceling correction filter $C\hat{}_{me}$ are output as a sequence of coefficients of an FIR filter. Accordingly, when an FIR filter is used for the canceling correction filter $C\hat{}_{me}$, the canceling correction table Tc can be built by directly inputting the coefficients of the canceling correction filter C output from the identification system into the canceling correction table Tc.

On the other hand, when a SAN filter is used for the canceling correction filter $C\hat{}_{me}$, a fast Fourier transform (FFT) is performed on the calculated coefficients of the canceling correction filter $C\hat{}_{me}$ (the sequence of coefficients of the FIR filter) output from the identification system, as shown in FIG. 9C. Thus, the coefficients for each frequency of the SAN filter can be acquired. The canceling correction table Tc can be built by inputting the acquired coefficients for each frequency of the SAN filter into the canceling correction table Tc.

With reference to FIG. 10, in the second example of the method of building the canceling correction table Tc, the sound pressure signals $S_e$, $S_m$ are measured in the same manner as in the first example of the method of building the canceling correction table Tc, and the coefficients of the transfer characteristics $C_e$, $C_m$ of the canceling sound y is extracted from the measured sound pressure signals $S_e$, $S_m$. At this time, the coefficients of the transfer characteristics $C_e$, $C_m$ of the canceling sound y are calculated as a sequence of coefficients of the FIR filter.

Next, by performing FFT on the coefficients of the transfer characteristics $C_e$, $C_m$ of the canceling sound y (the sequence of coefficients of FIR filter), the frequency characteristics of the transfer characteristics $C_e$, $C_m$ of the canceling sound y are calculated. Next, the coefficients of the canceling correction filter $C\hat{}_{me}$ are calculated by dividing the frequency characteristics of the transfer characteristics $C_e$ of the canceling sound y (transfer characteristics of the canceling sound y from the speaker 13 to the head position of the occupant) by the frequency characteristics of the transfer characteristics $C_m$ of the canceling sound y (transfer characteristics of the canceling sound y from the speaker 13 to the error microphone 14). At this time, the coefficients of the canceling correction filter $C\hat{}_{me}$ are calculated as coefficients for each frequency of the SAN filter. Accordingly, when a SAN filter is used for the canceling correction filter $C\hat{}_{me}$, the canceling correction table Tc can be built by inputting the acquired coefficients for each frequency of the SAN filter into the canceling correction table Tc.

On the other hand, when an FIR filter is used for the canceling correction filter $C^{\hat{}me}$, an inverse fast Fourier transform (IFFT) is performed on the calculated coefficients of the canceling correction filter $C\hat{}_{me}$ (coefficients for each frequency of the SAN filter). Accordingly, a sequence of coefficients of the FIR filter can be acquired. The canceling correction table Tc can be built by inputting the acquired sequence of coefficients of the FIR filter into the canceling correction table Tc.

The noise correction table (not shown) stored in the database unit 41 of the estimation signal correction unit 28 can also be built by a method similar to the method of building the canceling correction table Tc. However, when the noise correction table is built, the sound pressure signals $S_e$, $S_m$ may be measured while the vehicle 1 is traveling and the road noise d is actually generated.

The Modification of the First Embodiment

Figure 11:
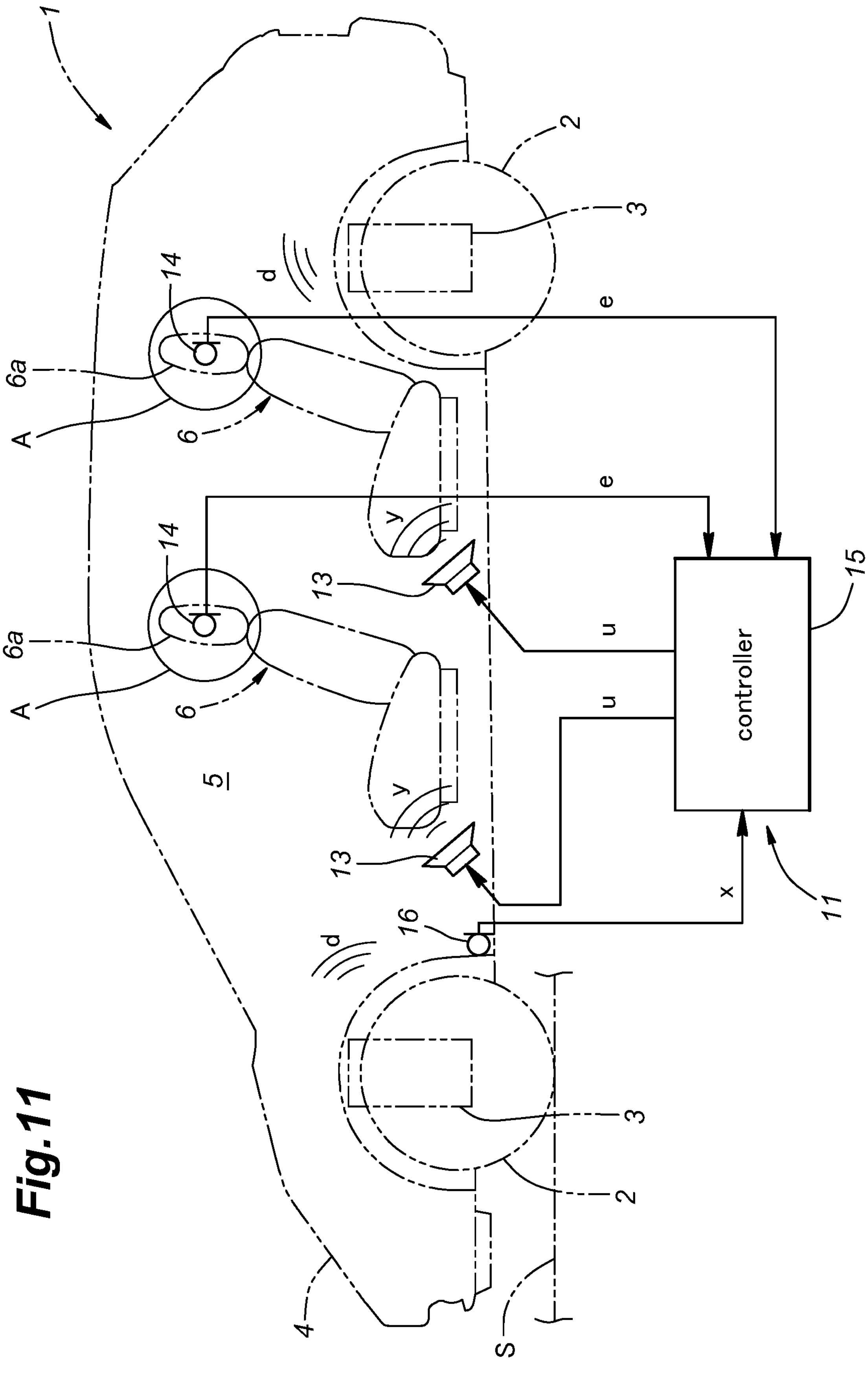
FIG. 11 is a schematic diagram showing a vehicle to which an active noise reduction system according to the modification of the first embodiment is applied.

In the above first embodiment, the vibration sensor 12 installed in the suspension 3 is used for an example of the reference signal generator. In another embodiment, as shown in FIG. 11, a reference microphone 16 arranged near the noise source in the vehicle cabin 5 may be used as an example of the reference signal generator. In this case, the reference microphone 16 may detect the sound generated by the noise source and generate the reference signal x according to the detected sound.

The Second Embodiment

Next, the second embodiment of the present invention will be described with reference to FIGS. 12 and 13. Further, explanations that overlap with those of the first embodiment of the present invention will be omitted as appropriate. Symbols "ADA" in FIG. 13 indicate "adaptive".

Figure 12:
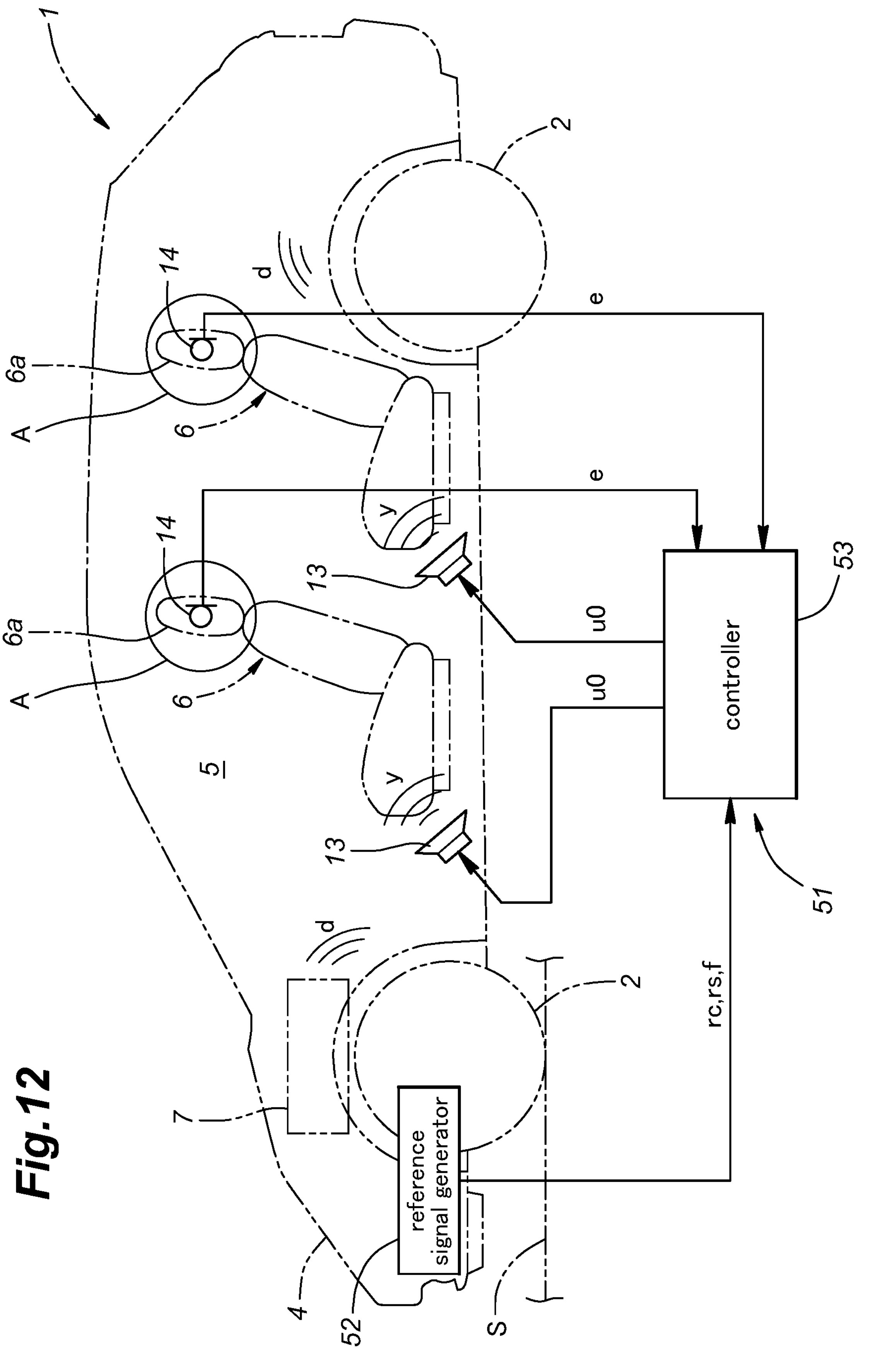
FIG. 12 is a schematic diagram showing a vehicle to which an active noise reduction system according to the second embodiment is applied.

FIG. 12 is a schematic diagram showing a vehicle 1 to which an active noise reduction system 51 (hereinafter abbreviated as "noise reduction system 51") according to the second embodiment is applied. When the vehicle 1 travels, an internal combustion engine 7 (hereinafter referred to as "engine 7") vibrates and a driving noise d (for example, a muffled sound of the engine 7 or a propeller shaft) is generated in a vehicle cabin 5.

The noise reduction system 51 according to the second embodiment is a feedback-controllable ANC device for reducing the driving noise d due to the vibration of the engine 7 as described above. Further, in another embodiment, when an electric motor is used instead of the engine 7 as the driving source of the vehicle 1, the noise reduction system 51 may reduce the driving noise d due to the vibration of the electric motor. The configurations other than a reference signal generator 52 and a controller 53 of the noise reduction system 51 according to the second embodiment are the same as those of the noise reduction system 11 according to the first embodiment, so the descriptions thereof will be omitted.

<The Reference Signal Generator 52>

Figure 13:
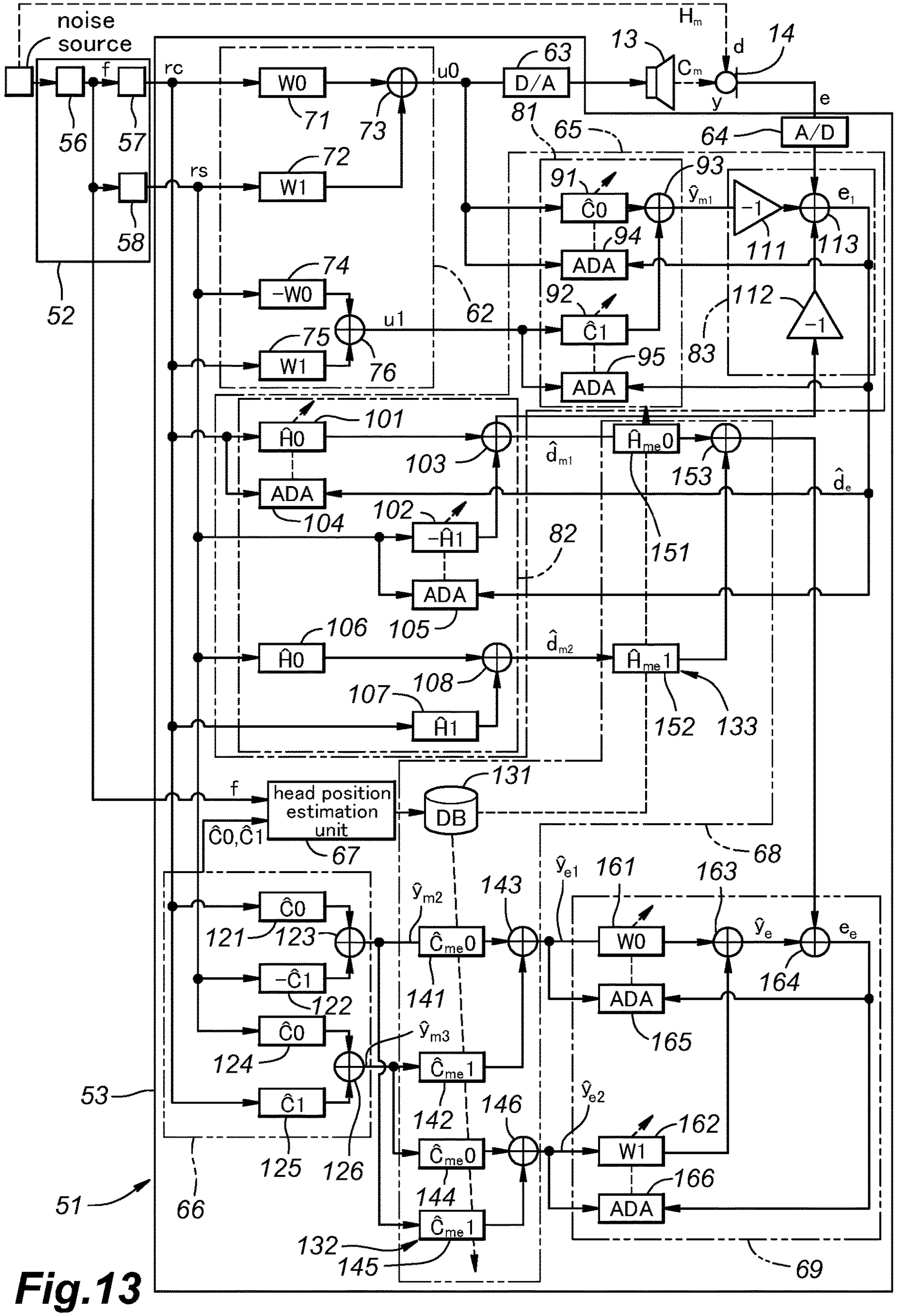
FIG. 13 is a functional block diagram showing the active noise reduction system according to the second embodiment.

With reference to FIG. 13, the reference signal generator 52 includes a frequency detection circuit 56, a cosine wave generation circuit 57, and a sine wave generation circuit 58.

The frequency detection circuit 56 detects the frequency of the driving noise d (hereinafter referred to as "the noise frequency f") based on vehicle information (for example, the rotation speed of the engine 7 or the vehicle speed) corresponding to the driving noise d. The frequency detection circuit 56 outputs the detected noise frequency f to the cosine wave generation circuit 57, the sine wave generation circuit 58, and the controller 53.

The cosine wave generation circuit 57 generates a reference cosine wave signal rc (an example of a reference signal) corresponding to the driving noise d based on the noise frequency f output from the frequency detection circuit 56. The cosine wave generation circuit 57 outputs the generated reference cosine wave signal rc to the controller 53.

The sine wave generation circuit 58 generates a reference sine wave signal rs (an example of a reference signal) corresponding to the driving noise d based on the noise frequency f output from the frequency detection circuit 56. The sine wave generation circuit 58 outputs the generated reference sine wave signal rs to the controller 53.

<The Controller 53>

The controller 53 includes, as functional components, a control signal output unit 62, a D/A conversion unit 63, an A/D conversion unit 64, an acoustic characteristics update unit 65, a reference signal correction unit 66, a head position estimation unit 67, an estimation signal correction unit 68, and a control filter update unit 69. The configurations of the D/A conversion unit 63 and the A/D conversion unit 64 are the same as those of the D/A conversion unit 23 and the second A/D conversion unit 24 of the controller 15 according to the first embodiment, so the descriptions thereof will be omitted.

<The Control Signal Output Unit 62>

The control signal output unit 62 of the controller 53 consists of a control filter W. A SAN filter is used for the control filter W. The control signal output unit 62 includes a first control filter unit 71, a second control filter unit 72, a first adder 73, a third control filter unit 74, a fourth control filter unit 75, and a second adder 76.

The first control filter unit 71 has a control filter coefficient W0. The control filter coefficient W0 forms a real part of the coefficients of the control filter W. The first control filter unit 71 filters the reference cosine wave signal rc output from the reference signal generator 52.

The second control filter unit 72 has a control filter coefficient W1. The control filter coefficient W1 forms an imaginary part of the coefficients of the control filter W. The second control filter unit 72 filters the reference sine wave signal rs output from the reference signal generator 52.

The first adder 73 generates a control signal u0 by adding together the reference cosine wave signal rc that has passed through the first control filter unit 71 and the reference sine wave signal rs that has passed through the second control filter unit 72. The first adder 73 outputs the generated control signal u0 to the D/A conversion unit 63 and the acoustic characteristics update unit 65.

The third control filter unit 74 has a coefficient acquired by reversing the polarity of the control filter coefficient W0. The third control filter unit 74 filters the reference sine wave signal rs output from the reference signal generator 52.

The fourth control filter unit 75 has the control filter coefficient W1. The fourth control filter unit 75 filters the reference cosine wave signal rc output from the reference signal generator 52.

The second adder 76 generates a control signal u1 by adding together the reference sine wave signal rs that has passed through the third control filter unit 74 and the reference cosine wave signal rc that has passed through the fourth control filter unit 75. The second adder 76 outputs the generated control signal u1 to the acoustic characteristics update unit 65.

<The Acoustic Characteristics Update Unit 65>

The acoustic characteristics update unit 65 of the controller 53 includes a canceling estimation signal generation unit 81, a noise estimation signal generation unit 82, and a virtual error signal generation unit 83.

The canceling estimation signal generation unit 81 consists of a secondary path filter C^. A SAN filter is used for the secondary path filter C^. The canceling estimation signal generation unit 81 includes a first secondary path filter unit

91, a second secondary path filter unit 92, an adder 93, a first secondary path update unit 94, and a second secondary path update unit 95.

The first secondary path filter unit 91 has a secondary path filter coefficient $C\hat{}0$. The secondary path filter coefficient $C\hat{}0$ forms a real part of the coefficients of the secondary path filter $C\hat{}$. The first secondary path filter unit 91 filters the control signal u0 output from the control signal output unit 62.

The second secondary path filter unit 92 has a secondary path filter coefficient $C\hat{}1$. The secondary path filter coefficient $C\hat{}1$ forms an imaginary part of the coefficients of the secondary path filter $C\hat{}$. The second secondary path filter unit 92 filters the control signal u1 output from the control signal output unit 62.

The adder 93 generates a canceling estimation signal $y\hat{}_{m1}$ by adding together the control signal u0 that has passed through the first secondary path filter unit 91 and the control signal u1 that has passed through the second secondary path filter unit 92. The adder 93 outputs the generated canceling estimation signal $y\hat{}_{m1}$ to the virtual error signal generation unit 83.

The first secondary path update unit 94 updates the secondary path filter coefficient $C\hat{}0$ using an adaptive algorithm such as the LMS algorithm. More specifically, the first secondary path update unit 94 updates the secondary path filter coefficient $C\hat{}0$ such that the virtual error signal $e_1$ (that will be described later) output from the virtual error signal generation unit 83 is minimized.

The second secondary path update unit 95 updates the secondary path filter coefficient $C\hat{}1$ using an adaptive algorithm such as the LMS algorithm. More specifically, the second secondary path update unit 95 updates the secondary path filter coefficient $C\hat{}1$ such that the virtual error signal $e_1$ output from the virtual error signal generation unit 83 is minimized.

The noise estimation signal generation unit 82 consists of a primary path filter $H\hat{}$. A SAN filter is used for the primary path filter $H\hat{}$. The noise estimation signal generation unit 82 includes a first primary path filter unit 101, a second primary path filter unit 102, a first adder 103, a first primary path update unit 104, a second primary path update unit 105, a third primary path filter unit 106, a fourth primary path filter unit 107, and a second adder 108.

The first primary path filter unit 101 has a primary path filter coefficient $H\hat{}0$. The primary path filter coefficient $H\hat{}0$ forms a real part of the coefficients of the primary path filter $H\hat{}$. The first primary path filter unit 101 filters the reference cosine wave signal rc output from the reference signal generator 52.

The second primary path filter unit 102 has a coefficient acquired by reversing the polarity of a primary path filter coefficient $H\hat{}1$. The primary path filter coefficient $H\hat{}1$ forms an imaginary part of the coefficients of the primary path filter $H\hat{}$. The second primary path filter unit 102 filters the reference sine wave signal rs output from the reference signal generator 52.

The first adder 103 generates a noise estimation signal $d\hat{}_{m1}$ by adding together the reference cosine wave signal rc that has passed through the first primary path filter unit 101 and the reference sine wave signal rs that has passed through the second primary path filter unit 102. The first adder 103 outputs the generated noise estimation signal $d\hat{}_{m1}$ to the virtual error signal generation unit 83 and the estimation signal correction unit 68.

The first primary path update unit 104 updates the primary path filter coefficient $H\hat{}0$ using an adaptive algorithm such as the LMS algorithm. More specifically, the first primary path update unit 104 updates the primary path filter coefficient $H\hat{}_0$ such that the virtual error signal $e_1$ output from the virtual error signal generation unit 83 is minimized.

The second primary path update unit 105 updates the primary path filter coefficient $H\hat{}1$ using an adaptive algorithm such as the LMS algorithm. More specifically, the second primary path update unit 105 updates the primary path filter coefficient $H_{1A}$ such that the virtual error signal $e_1$ output from the virtual error signal generation unit 83 is minimized.

The third primary path filter unit 106 has the primary path filter coefficient $H\hat{}0$. The third primary path filter unit 106 filters the reference sine wave signal rs output from the reference signal generator 52.

The fourth primary path filter unit 107 has the primary path filter coefficient $H\hat{}1$. The fourth primary path filter unit 107 filters the reference cosine wave signal rc output from the reference signal generator 52.

The second adder 108 generates the noise estimation signal $d\hat{}_{m2}$ by adding together the reference sine wave signal rs that has passed through the third primary path filter unit 106 and the reference cosine wave signal rc that has passed through the fourth primary path filter unit 107. The second adder 108 outputs the generated noise estimation signal $d\hat{}_{m2}$ to the estimation signal correction unit 68.

The virtual error signal generation unit 83 includes a first polarity reversing circuit 111, a second polarity reversing circuit 112, and an adder 113.

The first polarity reversing circuit 111 reverses the polarity of the canceling estimation signal $y\hat{}_{m1}$ output from the canceling estimation signal generation unit 81. The second polarity reversing circuit 112 reverses the polarity of the noise estimation signal $d\hat{}_{m1}$ output from the noise estimation signal generation unit 82.

The adder 113 generates the virtual error signal $e_1$ by adding together the error signal e, the canceling estimation signal $y\hat{}_{m1}$ that has passed through the first polarity reversing circuit 111, and the noise estimation signal $d\hat{}_{m1}$ that has passed through the second polarity reversing circuit 112. The adder 113 outputs the generated virtual error signal $e_1$ to the canceling estimation signal generation unit 81 and the noise estimation signal generation unit 82.

<The Reference Signal Correction Unit 66>

The reference signal correction unit 66 of the controller 53, like the canceling estimation signal generation unit 81, consists of the secondary path filter $C\hat{}$. When the coefficients $C\hat{}0$, $C\hat{}1$ of the secondary path filter $C\hat{}$ are updated in the canceling estimation signal generation unit 81, the updated coefficients $C\hat{}0$, $C\hat{}1$ of the secondary path filter $C\hat{}$ are output to the reference signal correction unit 66, and the coefficients $C\hat{}0$, $C\hat{}1$ of the secondary path filter $C\hat{}$ are updated in the reference signal correction unit 66. The reference signal correction unit 66 outputs the updated coefficients $C\hat{}0$, $C\hat{}1$ of the secondary path filter $C\hat{}$ to the head position estimation unit 67.

The reference signal correction unit 66 includes a third secondary path filter unit 121, a fourth secondary path filter unit 122, a first adder 123, a fifth secondary path filter unit 124, a sixth secondary path filter unit 125, and a second adder 126.

The third secondary path filter unit 121 has the secondary path filter coefficient $C\hat{}0$. The third secondary path filter unit 121 filters the reference cosine wave signal rc output from the reference signal generator 52.

The fourth secondary path filter unit 122 has a coefficient acquired by reversing the polarity of the secondary path filter coefficient C^. The fourth secondary path filter unit 122 filters the reference sine wave signal rs output from the reference signal generator 52.

The first adder 123 generates a canceling estimation signal $y\hat{}_{m2}$ by adding together the reference cosine wave signal rc that has passed through the third secondary path filter unit 121 and the reference sine wave signal rs that has passed through the fourth secondary path filter unit 122. The first adder 123 outputs the generated canceling estimation signal $y\hat{}_{m2}$ to the estimation signal correction unit 68.

The fifth secondary path filter unit 124 has the secondary path filter coefficient C^0. The fifth secondary path filter unit 124 filters the reference sine wave signal rs output from the reference signal generator 52.

The sixth secondary path filter unit 125 has the secondary path filter coefficient C^1. The sixth secondary path filter unit 125 filters the reference cosine wave signal rc output from the reference signal generator 52.

The second adder 126 generates a canceling estimation signal $y\hat{}_{m3}$ by adding together the reference sine wave signal rs that has passed through the fifth secondary path filter unit 124 and the reference cosine wave signal rc that has passed through the sixth secondary path filter unit 125. The second adder 126 outputs the generated canceling estimation signal $y\hat{}_{m3}$ to the estimation signal correction unit 68.

<The Head Position Estimation Unit 67>

The head position estimation unit 67 of the controller 53 estimates the head position of the occupant in the vehicle cabin 5 based on the noise frequency f output from the reference signal generator 52 and the coefficients C^0, C^1 of the secondary path filter C^ output from the reference signal correction unit 66. The method of estimating the head position of the occupant by the head position estimation unit 67 is the same as the method of estimating the head position of the occupant by the head position estimation unit 27 according to the first embodiment, so the descriptions thereof will be omitted.

<The Estimation Signal Correction Unit 68>

The estimation signal correction unit 68 of the controller 53 includes a database unit 131, a canceling correction unit 132, and a noise correction unit 133. The configuration of the database unit 131 is the same as that of the database unit 41 according to the first embodiment, so the descriptions thereof will be omitted.

The canceling correction unit 132 consists of a canceling correction filter $C\hat{}_{me}$. A SAN filter is used for the canceling correction filter $C\hat{}_{me}$. The canceling correction unit 132 includes a first canceling correction filter unit 141, a second canceling correction filter unit 142, a first adder 143, a third canceling correction filter unit 144, a fourth canceling correction filter unit 145, and a second adder 146.

The first canceling correction filter unit 141 has a canceling correction filter coefficient $C\hat{}_{me}0$. The canceling correction filter coefficient $C_0$ forms a real part of the coefficients of the canceling correction filter C. The first canceling correction filter unit 141 filters the canceling estimation signal $y\hat{}_{m2}$ output from the reference signal correction unit 66.

The second canceling correction filter unit 142 has a canceling correction filter coefficient $C\hat{}_{me}1$. The canceling correction filter coefficient $C\hat{}_{me}1$ forms an imaginary part of the coefficients of the canceling correction filter $C\hat{}_{me}$. The second canceling correction filter unit 142 filters the canceling estimation signal $y\hat{}_{m3}$ output from the reference signal correction unit 66.

The first adder 143 generates a canceling estimation signal $y\hat{}_{e1}$ by adding together the canceling estimation signal $y\hat{}_{m2}$ that has passed through the first canceling correction filter unit 141 and the canceling estimation signal $y\hat{}_{m3}$ that has passed through the second canceling correction filter unit 142. The first adder 143 outputs the generated canceling estimation signal $y\hat{}_{e1}$ to the control filter update unit 69.

The third canceling correction filter unit 144 has the canceling correction filter coefficient $C_0$. The third canceling correction filter unit 144 filters the canceling estimation signal $y\hat{}_{m3}$ output from the reference signal correction unit 66.

The fourth canceling correction filter unit 145 has the canceling correction filter coefficient $C\hat{}_{me}1$. The fourth canceling correction filter unit 145 filters the canceling estimation signal $y\hat{}_{m2}$ output from the reference signal correction unit 66.

The second adder 146 generates a canceling estimation signal $y\hat{}_{e2}$ by adding together the canceling estimation signal $y\hat{}_{m3}$ that has passed through the third canceling correction filter unit 144 and the canceling estimation signal $y\hat{}m_2$ that has passed through the fourth canceling correction filter unit 145. The second adder 146 outputs the generated canceling estimation signal $y\hat{}_{e2}$ to the control filter update unit 69.

The noise correction unit 133 consists of a noise correction filter $H\hat{}_{me}$. A SAN filter is used for the noise correction filter $H\hat{}_{me}$. The noise correction unit 133 includes a first noise correction filter unit 151, a second noise correction filter unit 152, and an adder 153.

The first noise correction filter unit 151 has a noise correction filter coefficient $H\hat{}_{me}0$. The noise correction filter coefficient $H\hat{}_{me}0$ forms a real part of the coefficients of the noise correction filter $H\hat{}_{me}$. The first noise correction filter unit 151 filters the noise estimation signal $d\hat{}_{m1}$ output from the noise estimation signal generation unit 82.

The second noise correction filter unit 152 has a noise correction filter coefficient $H\hat{}_{me}1$. The noise correction filter coefficient $H\hat{}_{me}1$ forms an imaginary part of the coefficients of the noise correction filter $H\hat{}_{me}$. The second noise correction filter unit 152 filters the noise estimation signal $d\hat{}_{m2}$ output from the noise estimation signal generation unit 82.

The adder 153 generates a noise estimation signal $d\hat{}_{e}$ by adding together the noise estimation signal $d\hat{}_{m1}$ that has passed through the first noise correction filter unit 151 and the noise estimation signal $d\hat{}m_2$ that has passed through the second noise correction filter unit 152. The adder 153 outputs the generated noise estimation signal $d\hat{}_{e}$ to the control filter update unit 69.

<The Control Filter Update Unit 69>

The control filter update unit 69 of the controller 53 consists of the control filter W, like the control signal output unit 62. The control filter update unit 69 includes a fifth control filter unit 161, a sixth control filter unit 162, a first adder 163, a second adder 164, a first control update unit 165, and a second control update unit 166.

The fifth control filter unit 161 has the control filter coefficient W0. The fifth control filter unit 161 filters the canceling estimation signal $y\hat{}_{e1}$ output from the estimation signal correction unit 68.

The sixth control filter unit 162 has the control filter coefficient W1. The sixth control filter unit 162 filters the canceling estimation signal $y\hat{}_{e2}$ output from the estimation signal correction unit 68.

The first adder 163 generates the canceling estimation signal $y\hat{}_{e}$ by adding together the canceling estimation signal $y\hat{}_{e1}$ that has passed through the fifth control filter unit 161 and the canceling estimation signal $y\hat{}_{e2}$ that has passed through the sixth control filter unit 162. The first adder 163 outputs the generated canceling estimation signal $\hat{y}_e$ to the second adder 164.

The second adder 164 generates a virtual error signal $e_e$ by adding together the canceling estimation signal $\hat{y}_e$ and the noise estimation signal $\hat{d}_e$. The second adder 164 outputs the generated virtual error signal $e_e$ to the first control update unit 165 and the second control update unit 166.

The first control update unit 165 updates the control filter coefficient W0 using an adaptive algorithm such as the LMS algorithm. More specifically, the first control update unit 165 updates the control filter coefficient W0 such that the virtual error signal $e_e$ output from the second adder 164 is minimized.

The second control update unit 166 updates the control filter coefficient W1 using an adaptive algorithm such as the LMS algorithm. More specifically, the second control update unit 166 updates the control filter coefficient W1 such that the virtual error signal $e_e$ output from the second adder 164 is minimized.

When the coefficients W0, W1 of the control filter W are updated in the control filter update unit 69, the updated coefficients W0, W1 of the control filter W are output to the control signal output unit 62, and the coefficients W0 and W1 of the control filter W are updated in the control signal output unit 62.

The Effects of the Second Embodiment

In the controller 53 according to the second embodiment, SAN filters are used as the control filter W, the primary path filter $\hat{H}$, and the secondary path filter $\hat{C}$. Accordingly, the calculation amount of the controller 53 can be reduced as compared with a case where FIR filters are used as these filters. Thus, the noise reduction system 51 can be realized using an inexpensive ECU.

Concrete embodiments of the present invention have been described in the foregoing, but the present invention should not be limited by the foregoing embodiments and various modifications and alterations are possible within the scope of the present invention.

The invention claimed is:

1. An active noise reduction system for reducing a noise in an internal space of a mobile body, the active noise reduction system comprising:

- a reference signal generator configured to generate a reference signal corresponding to the noise;
- a canceling sound generator configured to generate a canceling sound for canceling the noise;
- an error detector configured to detect an error between the noise and the canceling sound and generate an error signal corresponding to the error; and
- a controller configured to control the canceling sound generator based on the reference signal and the error signal, wherein the controller is configured to:

- update an estimation value of acoustic characteristics in the internal space based on the reference signal and the error signal;
- estimate a head position of an occupant in the internal space based on the updated estimation value of the acoustic characteristics in the internal space; and
- update a control filter based on the estimated head position of the occupant, the control filter being a filter for controlling the canceling sound generator.

2. The active noise reduction system according to claim 1, wherein the controller is further configured to:

- based on the estimated head position of the occupant, generate an estimation signal of the noise at the head position of the occupant and an estimation signal of the canceling sound at the head position of the occupant; and
- update the control filter such that an error between the estimation signal of the noise at the head position of the occupant and the estimation signal of the canceling sound at the head position of the occupant is minimized.

3. The active noise reduction system according to claim 2, wherein the controller is further configured to:

- based on the reference signal and the error signal, update an estimation value of transfer characteristics of the noise from a noise source to the error detector and an estimation value of transfer characteristics of the canceling sound from the canceling sound generator to the error detector;
- based on the updated estimation value of the transfer characteristics of the noise from the noise source to the error detector, generate an estimation signal of the noise at a position of the error detector;
- generate the estimation signal of the noise at the head position of the occupant by correcting the estimation signal of the noise at the position of the error detector using a prescribed noise correction filter;
- based on the updated estimation value of the transfer characteristics of the canceling sound from the canceling sound generator to the error detector, generate an estimation signal of the canceling sound at the position of the error detector; and
- generate the estimation signal of the canceling sound at the head position of the occupant by correcting the estimation signal of the canceling sound at the position of the error detector using a prescribed canceling correction filter.

4. The active noise reduction system according to claim 3, wherein the canceling correction filter is defined as a ratio of transfer characteristics of the canceling sound from the canceling sound generator to the head position of the occupant to the transfer characteristics of the canceling sound from the canceling sound generator to the error detector, and

- the noise correction filter is defined as a ratio of transfer characteristics of the noise from the noise source to the head position of the occupant to the transfer characteristics of the noise from the noise source to the error detector.

5. The active noise reduction system according to claim 3, wherein the controller is further configured to store in a table each of a first relationship and a second relationship, the first relationship being a relationship between the head position of the occupant and a coefficient of the canceling correction filter, the second relationship being a relationship between the head position of the occupant and a coefficient of the noise correction filter.

6. The active noise reduction system according to claim 1, wherein the controller includes a neural network that has learned a relationship between the estimation value of the acoustic characteristics in the internal space and the head position of the occupant, and is configured to estimate the head position of the occupant by inputting the estimation value of the acoustic characteristics in the internal space into the neural network.

* * * * *